Oct. 13, 1953      R. W. GEIGER      2,655,091
FILTER
Filed Aug. 7, 1950
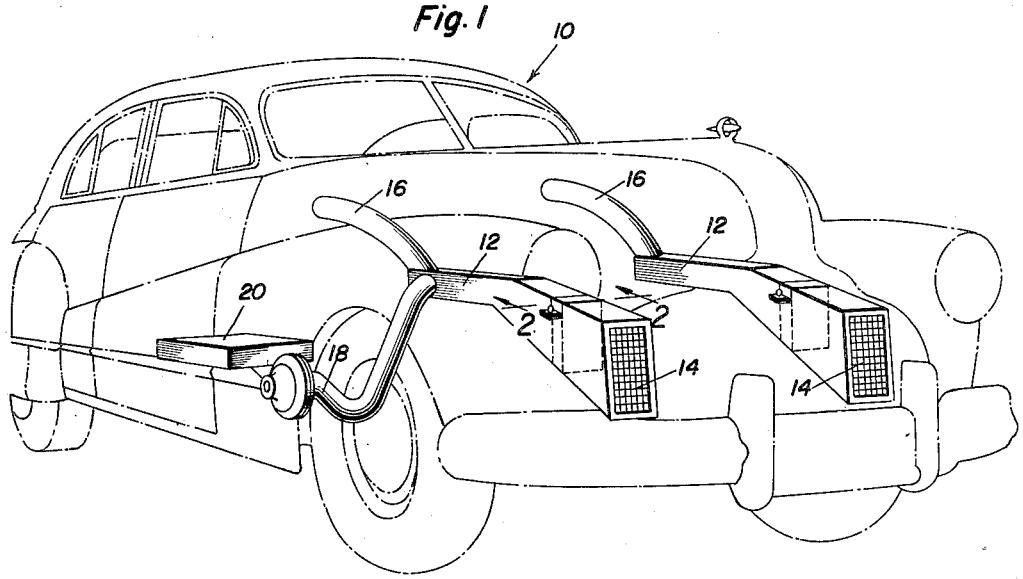
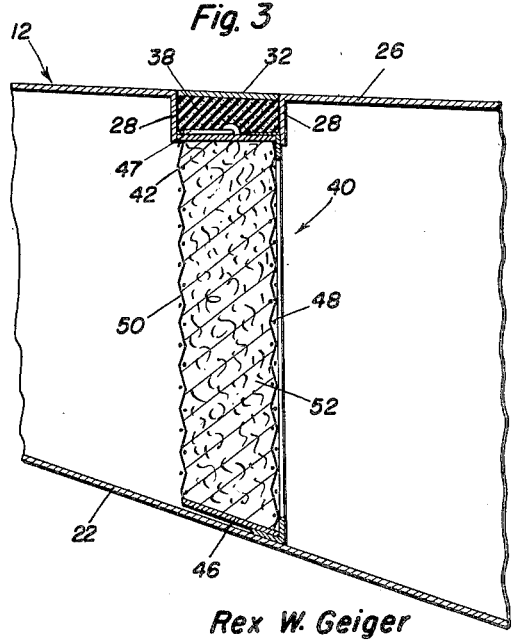
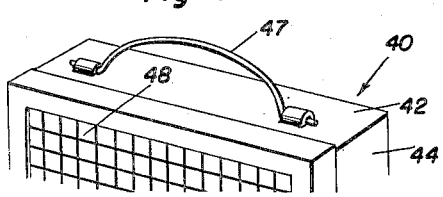
Rex W. Geiger
INVENTOR.

UNITED STATES PATENT OFFICE 2,655,091

FILTER

Rex W. Geiger, York, Nebr.

Application August 7, 1950, Serial No. 178,035

4 Claims. (Cl. 98—2)

This invention comprises novel and useful improvements in a filter and more specifically pertains to a removable filter unit specifically adapted for use with conventional air ventilating systems for automotive vehicles.

The primary object of this invention is to provide a removable air filtering attachment for use with the air ventilating system for automotive vehicles.

A further object of the invention is to provide an air filtering attachment of the character set forth in the preceding object, which may be readily applied to existing air ventilating systems for automotive vehicles.

Yet another object of the invention is to provide an air filtering unit which is adapted for easy insertion into and removal from the air duct of an air ventilating system for automotive vehicles whereby the filter may be readily replaced or renewed as required, and will be effectively and securely retained and sealed in the air duct without danger or rattling or escapage of air from the duct during use of the filter.

Yet another object of the invention is to provide an improved removable air filter for an air duct of an air ventilating system of automotive vehicles which shall have an improved manner of insertion or withdrawal from the air duct; and wherein a closure for the filter insertion opening serves to resiliently retain and seal the air filter in the duct.

These, together with various ancillary features and objects of the invention, which will later become apparent as the following description proceeds, are attained by the present invention, a preferred embodiment of which should be illustrated, by way of example only, in the accompanying drawings, wherein:

Figure 1 is a perspective view, partly schematic, showing a conventional form of air ventilating system including an air duct for use with an automotive vehicle, and to which the improved filter construction forming the subject of this invention has been applied;

Figure 2 is a vertical transverse sectional view through the air duct, taken substantially from the plane indicated by the section line 2—2 of Figure 1 and showing the removable filter seated and secured in the duct;

Figure 3 is a vertical transverse sectional view taken substantially from the plane indicated by the sectional line 3—3 in Figure 2; and, Figure 4 is a fragmentary perspective view of the upper portion of the removable filter unit in accordance with this invention.

In conventional air ventilating systems for the bodies of automotives vehicles, it has been customary to provide an air duct extending from the front of the vehicle and having a screened inlet opening disposed immediately behind suitable grills at the front of the vehicle body and which have exit or exhaust means selectively opening into the interior of the vehicle to admit fresh air thereto; or to discharge it to a heater to admit and circulate heated air to the vehicle body. It is in such a conventional system that the principle of this invention may be advantageously applied, and such a system has been illustrated in Figure 1 in order to clearly depict the manner of applying the principles of this invention thereto.

Referring now more specifically to Figure 1, it will be seen that the numeral 10 designates generally a conventional form of automotive vehicle which is provided with air ducts 12, two being shown in the present illustration, these air ducts having the customary screen adit or inlet openings 14 disposed at the front of the vehicle, and being provided with a pair of conduits 16 constituting exhaust or exit means whereby the air inducted into the duct 12 may be discharged into the interior of the vehicle under control of suitable valves not shown. The duct 12 is further provided with a conduit 18 through which after passing through a suitable heating medium, not shown, air is discharged into register 20 disposed in the vehicle whereby heated air may be supplied to the vehicle body.

In such an installation, the conventional duct 12, as shown best in Figures 2 and 3, customarily comprises a sheet metal conduit including a bottom wall 22, integral side walls 24 and a top wall 26, such duct being usually of rectangular or square cross-section, the bottom wall 22 being sloping as shown in Figures 1 and 3 towards the inlet or funnel shaped adit of the same.

In accordance with this invention, an opening is made in one of the walls of the air duct, the opening being most conveniently formed in the top wall 26 and the upper portions of the side walls 24 thereof by cutting a transverse slit in the top wall 26 and a pair of vertical slits in the upper parts of the side walls 24 on both sides of the transverse slit, then slitting the joining edges of the top wall and the side walls between the transverse slits. The edges of the slit in the top wall 26 are downwardly turned as at 28 to provide parallel inturned flanges which constitute guide and retaining means for a filter unit to be inserted in the opening as set forth hereinafter, while the upper edges of the side walls 24 between the vertical slits are folded outwardly to provide out turned flanges 30 as shown best in Figure 2.

The removable closure for this opening is provided, the same consisting of a sheet metal plate or strip 32 which is formed to close the slot made in top and side walls of the air duct, and is provided with out turned flanges 34 which may be detachably secured to the flanges 30 as by means of thumb screws 36. Secured to the inner surface of the closure 32 is a body or layer of yieldable or cushioning 38 of any desired character such as felt, sponge rubber or the like, and which serves to form a substantially air tight seal between the closure 32 and the downturned flanges 28, as shown in Figure 3.

Referring now more particularly to Figures 3 and 4, it will be perceived that there is provided a removable air filter unit indicated generally by the numeral 40 which is adapted to be inserted into the air duct through the slot or opening formed in the wall of the same and to be removed therefrom as found to be necessary. This filter unit may conveniently comprise a metallic frame consisting of a top wall 42, side walls 44 and a bottom wall 46. While the top wall 42 is intended to be disposed in a substantially horizontal plane that is, in parallel relation to the duct top wall 26, the bottom wall 46 is disposed in an inclination to the top wall so that the same is likewise disposed parallel in relation to the inclined bottom wall 22 of the air duct. A suitable handle member 47 is secured to the top wall 42 whereby the filter unit may be readily inserted or withdrawn from the air duct.

The filter unit further includes sheets of wash screening 48 and 50 disposed at the two sides of the metallic frame of the unit and a mass of any suitable filter material 52 is disposed within the frame and between the sheets 48 and 50.

The arrangement is such that when the cover or closure 32 is removed, the entire unit may be slid downwardly through the opening in the top wall 26, the flanges 28 serving as guides to facilitate this vertical sliding movement. When the filter is completely inserted in the duct, the bottom wall 26 will be seated upon the bottom wall 22 of the duct as shown in Figure 3, while the top wall 42 will be disposed between the downturned flanges 28 and retained therein. As will be readily understood, the filter unit will extend substantially the entire width of the duct so that substantially all of the air passing therethrough will be subjected to a complete filtering. When the closure 32 is placed in position, the body of compressible material 38 will receive the handle 47 and will press downwardly upon the top of the filter unit, thus serving to compressibly hold and retain the same in tight, nonrattling engagement with walls of the duct.

It will thus be seen that a filtering unit has been provided which may be readily removed as found necessary for inspection, servicing or repairs or replacement, which is of an inexpensive construction, may be readily applied to existing air ventilating systems and will effectively screen and filter the air supplied to the interior of the vehicle through such systems.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. In an air ventilating system for automobiles, an air duct having an adit and exit communicating with the automobile interior, said duct having an elongated opening extending transversely thereof, an air filter disposed in said duct and adapted to be removed and inserted through said opening, inwardly extending flanges on said duct at opposite sides of said opening extending into the interior of said duct and constituting guide and retaining flanges for said filter, laterally outwardly extending tabs on said duct at the ends of said opening, a closure for said opening secured to said tabs.

2. In an air ventilating system for automobiles, an air duct having an adit and exit communicating with the automobile interior, said duct having an elongated opening extending transversely thereof, an air filter disposed in said duct and adapted to be removed and inserted through said opening, inwardly extending flanges on said duct at opposite sides of said opening extending into the interior of said duct and constituting guide and retaining flanges for said filter, laterally outwardly extending tabs on said duct at the ends of said opening, a closure for said opening secured to said tabs, said closure including a body of cushioning material disposed between said flanges yieldingly engaging said filter and sealing said opening.

3. In an air ventilating system for automobiles, an air duct having an adit and exit communicating with the automobile interior, said duct having an elongated opening extending transversely thereof, an air filter disposed in said duct and adapted to be removed and inserted through said opening, inwardly extending flanges on said duct at opposite sides of said opening extending into the interior of said duct and constituting guide and retaining flanges for said filter, laterally outwardly extending tabs on said duct at the ends of said opening, a closure for said opening secured to said tabs, said closure including a strap, end flanges on said strap resting on said tabs and fasteners securing said end flanges to said tabs.

4. In an air ventilating system for automobiles, an air duct having an adit and exit communicating with the automobile interior, said duct having an elongated opening extending transversely thereof, an air filter disposed in said duct and adapted to be removed and inserted through said opening, inwardly extending flanges on said duct at opposite sides of said opening extending into the interior of said duct and constituting guide and retaining flanges for said filter, laterally outwardly extending tabs on said duct at the ends of said opening, a closure for said opening secured to said tabs, said closure comprising a strap covering said opening, a body of cushioning material secured to said strap intermediate the ends thereof and being disposed between said flanges, said body yieldingly engaging said filter and sealing said opening, end flanges on said strap resting on said tabs and fasteners securing said end flanges to said tabs.

REX W. GEIGER.

References Cited in the file of this patent

UNITED STATES PATENTS

| Number | Name | Date |
|---|---|---|
| 1,502,844 | Bingman | July 29, 1924 |
| 1,847,609 | Harnett | Mar. 1, 1932 |
| 2,057,568 | Gerard | Oct. 13, 1936 |
| 2,213,016 | Perkins | Aug. 27, 1940 |
| 2,308,887 | McCollum | Jan. 19, 1943 |